United States Patent [19]

Markfelder et al.

[11] 4,089,570
[45] May 16, 1978

[54] JOURNAL BEARING WITH AXIALLY SPLIT BEARING RINGS

[75] Inventors: Günter Markfelder; Heinrich Hofmann, both of Schweinfurt; Günter Scharting, Gochsheim, all of Germany

[73] Assignee: Kugelfischer Georg Schafer & Co., Schweinfurt, Germany

[21] Appl. No.: 762,563

[22] Filed: Jan. 26, 1977

[30] Foreign Application Priority Data

Jan. 31, 1976    Germany .................................... 2603685

[51] Int. Cl.² .......................... F16C 23/06; F16C 33/60
[52] U.S. Cl. ......................................... 308/194; 308/196;
 308/214; 308/216; 308/236; 403/265
[58] Field of Search ................. 308/196, 194, DIG. 11,
 308/214, 174, 189, 195, 236, 207, 216, 211, 219,
 238, DIG. 8; 403/326, 265, 267; 29/460, 460 X;
 264/263

[56] References Cited

U.S. PATENT DOCUMENTS

| 2,622,946 | 12/1952 | McKissick et al. | 308/211 |
| 3,672,737 | 6/1972 | Jacob | 308/196 |
| 3,913,993 | 10/1975 | Ernst | 308/196 |
| 3,920,787 | 11/1975 | McDowell et al. | 264/263 |
| 3,986,754 | 10/1976 | Torrant | 308/196 |

Primary Examiner—Trygve M. Blix
Assistant Examiner—Douglas C. Butler
Attorney, Agent, or Firm—Karl F. Ross

[57] ABSTRACT

A ball or roller bearing with two symmetrical halves, each designed to absorb both radial and axial stresses, comprises two axially abutting inner rings on a shaft and two axially abutting outer rings in a housing wall coaxially surrounding the shaft. The inner rings form seats for respective rows of balls or rollers engaging contact zones on the inner peripheral surfaces of the outer rings that are offset from these seats in either an axially inward or an axially outward direction. In the first instance, the housing wall has an annular groove aligned with an annular recess or groove of the same axial width which is formed by two peripheral rabbets on the outer rings; in the second instance the inner rings are rabbeted to form an annular recess or groove aligned with an axially coextensive peripheral groove on the shaft. In either case, the two aligned grooves form an annular channel of rectangular cross-section occupied by a destructible retaining ring of plastic material whose axial width is equal to or slightly less than that of the channel and which can be molded in situ.

11 Claims, 2 Drawing Figures

JOURNAL BEARING WITH AXIALLY SPLIT BEARING RINGS

FIELD OF THE INVENTION

Our present invention relates to a journal bearing designed to absorb both radial and axial stresses between a unitary housing wall and a shaft rotatably supported therein.

BACKGROUND OF THE INVENTION

In commonly owned U.S. Pat. No. 3,975,066 there has been disclosed a journal bearing of this type divided into two symmetrical halves, each half comprising a set of rotary bodies such as balls or rollers seated in an annular row between an inner ring hugging the shaft and an outer ring spacedly surrounding the inner ring. The seat axes of these bodies are oppositely inclined with reference to a radial plane of symmetry, converging either toward or away from the shaft axis in what may be described as an "X" mounting or an "O" mounting. The patent also shows the possibility of splitting either ring into two parts, one for each bearing half, while leaving the other ring undivided and common to both halves.

From U.S. Pat. No. 2,627,120 there is known a bearing structure of the same general type, with outwardly converging seat axes ("O" mounting), in which the inner and outer rings are both split into axially separated halves. The outer ring halves abut, from opposite sides, an annular flange or rib on an inner peripheral wall surface of a surrounding housing so as to be held against displacement in an axially inward direction, i.e. toward each other. The inner ring halves are kept apart by an annular spacer which is freely slidable on a shaft whose width, relative to that of the confronting rib, is chosen to sustain a desired degree of axial prestress.

The presence of such a fixedly positioned annular rib in a bearing of the type referred to, on the convergence side of the seat axes, has the advantage of requiring only one ring to be axially immobilized by external abutments as the rib absorbs axial stresses exerted upon either half of the other bearing ring through the rotary bodies. A drawback of the known arrangement, however, is the need for precisely correlating the axial width of the fixed rib on one peripheral surface, namely that of the housing, with that of the movable annular spacer on the opposite peripheral surface, i.e., that of the shaft. If the width of the spacer diminishes through wear or shrinkage, an axial pressure acting upon one ring half adjoining that spacer is no longer transmitted to the other ring half and must therefore be absorbed entirely by the rib which, accordingly, must be dimensioned to resist considerable loads if frequent replacements of the spacer or reshapings of the rib are to be avoided.

OBJECTS OF THE INVENTION

The general object of our present invention, therefore, is to provide an improved bearing of the character set forth which obviates the aforementioned drawback.

Another object is to provide a bearing of this type which can be conveniently disassembled, in case of need, without requiring any relative relocation of the housing and its shaft.

A further object, allied with the preceding one, is to provide means in such a bearing simplifying its reassembly.

SUMMARY OF THE INVENTION

A bearing according to our present invention comprises geometrically continuous inner and outer rings, i.e. rings which could be unitary or axially split (as in the commonly owned U.S. Pat. No. 3,975,066 referred to above) but whose halves are not axially separated. One of these rings, i.e. the one lying on the side of convergence of the seat axes of the associated rotary bodies, has an annular peripheral recess or groove receiving an annular rib on the adjoining peripheral surface of either the housing or the shaft; the other ring is axially immobilized between abutments on the opposite peripheral surface, i.e. that of the shaft or the housing.

If the bearing ring provided with the annular recess is axially split, that recess is advantageously formed by two annular rabbets on confronting faces of the two ring halves. In principle, however, the recess could be limited to one of the ring halves on either side of the radial plane of symmetry of the bearing.

The geometrical continuity of the ring bracketed by the abutments insures that only a fraction of an axial force acting upon that ring will be transmitted through one set of rotary bodies to a corresponding side of the recessed ring and thereby to the rib retaining the latter ring in position. That rib, accordingly, need not have the same strength as the (usually metallic) housing, shaft and bearing rings but could not be made of a considerably more yieldable material, e.g. a synthetic resin. The use of such a resinous ring has the advantage of allowing the bearing rings to be extracted after removal of only one abutment, with generation of a shear force destroying the retaining rib which can subsequently be reconstituted, upon reassembly, by molding in situ. Such a formation in situ of the rib is facilitated if, in a manner known per se (see, for example, U.S. Pat. No. 2,622,946), the rib is not integral with its supporting member (housing or shaft) but is designed as a retaining ring received in an annular groove on the periphery of that member confronting the annular recess of the adjoining bearing ring.

BRIEF DESCRIPTION OF THE DRAWING

The above and other features of our invention will now be described in detail with reference to the accompanying drawing in which.

SPECIFIC DESCRIPTION OF THE DRAWING

Figure 1:
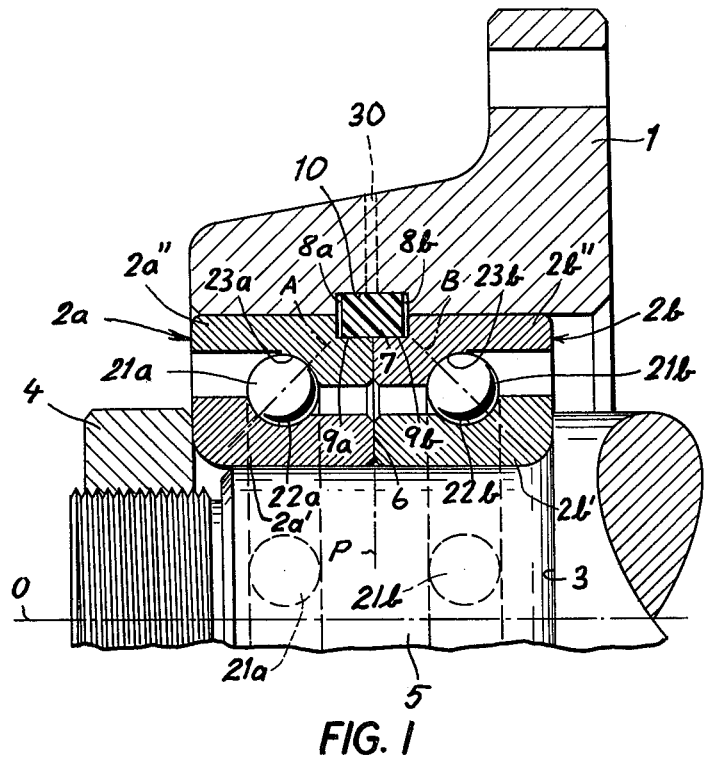
FIG. 1 is an axial sectional view of a representative portion of a journal bearing according to our invention.

In FIG. 1 we have shown an annular flange 1 forming part of a housing, not further illustrated, in which a shaft 5 is rotatably journaled by a bearing according to our invention, the flange 1 being centered on shaft axis O. The bearing comprises two symmetrical halves 2a and 2b each including a respective half 2a', 2b' of an inner ring and a respective half 2a'', 2b'' of an outer ring. The two halves of each ring abut each other along a transverse plane of symmetry P.

Shaft 5 has a shoulder 3 forming a right-hand abutment for the inner ring 2a', 2b', a threaded extremity of the shaft carrying a nut 4 which acts as a left-hand abutment therefor. The halves 2a'' and 2b'' are force-fitted into the flange 1 whose inner peripheral wall surface has an annular groove 10 bisected by the plane P. Groove 10 confronts a similar annular groove or recess of the same axial width constituted by a pair of rabbets 9a, 9b on adjoining faces 6 of ring halves 2a", 2b". The two aligned grooves 9a – 9b and 10 together define an annular channel of rectangular cross-section receiving a retaining ring 7 of plastic material.

The two bearing rings are separated from each other by annular gaps occupied by two sets of rotary bodies 21a and 21b, here shown as balls or spheres, which are cradled in annular seats 22a, 22b so as to be positively held against axial displacement relative thereto; bodies 21a and 21b also rest against arcuate contact zones 23a, 23b of ring halves 2a", 2b" which are axially inwardly offset from the cradles 21a, 21b so as to define oblique seat axes A, B converging toward the grooved wall surface of housing flange 1.

Retaining ring 7 is shown to have a width slightly less than that of the channel formed by the two aforementioned grooves, thus leaving a pair of narrow gaps 8a and 8b; since the ring 7 may axially shift in that channel, the relative width of these gaps is of course subject to variation and one of them may even disappear completely. The small gap width insures that an axial thrust exerted from shaft 5 upon one of the inner ring halves 2a', 2b' and via the corresponding balls 21a or 21b upon outer ring half 2a' or 2b' is taken up by the flange 1 with only minor impact. The gaps 8a, 8b may be due to shrinkage of the ring 7 molded in situ by the introduction of a hardenable plastic material into the channel through a conduit 30 serving as an injection orifice.

The two sets of balls 21a and 21b may be held in place by respective cages which have not been illustrated but which may be of the type shown in commonly owned U.S. Pat. No. 3,975,066.

When it is desired to dislodge the bearing 2a, 2b from the space between flange 1 and shaft 5, it is merely necessary to unscrew the nut 4 whereupon the bearing can be ejected by hammer blows upon right-hand bearing half 2b, causing the ring 7 to be destroyed by the resulting shear forces. After disassembly, the fragments of this retaining ring can be readily removed whereupon the injection orifice 30 can be cleaned. A subsequent reintroduction of the bearing halves into the flange 1 may be followed by another molding operation to produce a new retaining ring 7. If such destructive disassembly is not desired, retainer 7 can also be a split metallic ring fully occupying the groove 10; in that instance the shaft 5 carrying bearing half 2b is introduced first into flange 1 whereupon bearing half 2a is emplaced and nut 4 is screwed onto the shaft end to complete the assembly.

Figure 2:
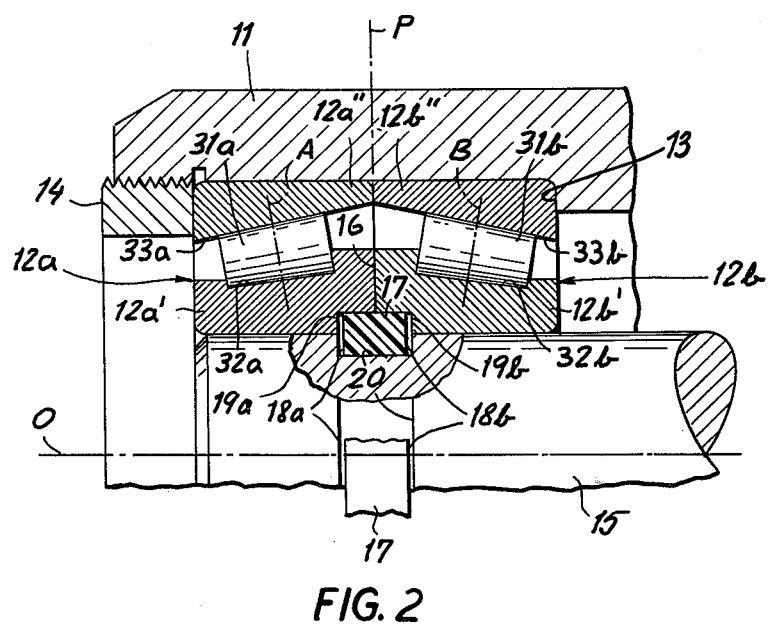
FIG. 2 is a similar view showing a modification.

In FIG. 2 we have shown an inversion of the arrangement in FIG. 1 wherein two bearing halves 12a and 12b consist of inner ring halves 12a', 12b' and outer ring halves 12a", 12b" separated by rotary bodies 31a, 31b in the form of slightly frustoconical rollers which are cradled in seats 32a, 32b of inner ring halves 12a', 12b' and rest against contact zones 33a, 33b of outer ring halves 12a", 12b", their seat axes A and B converging toward the axis O of a shaft 15 journaled in a coaxial housing flange 11. The outer bearing ring 12a", 12b" is clamped between a shoulder 13 of flange 11 and a nut 14 threaded into an entrance opening of that flange.

Shaft 15 has an annular peripheral groove 20 confronting a similar groove or recess formed by rabbets 19a, 19b on adjoining faces 16 of ring halves 12a', 12'. The annular channel defined by these two grooves, again of rectangular cross-section, is occupied by a plastic retaining ring 17 which is also shown to leave narrow gaps 18a, 18b in the channel. Ring 17 can be produced by molding in situ as described with reference to ring 7 of FIG. 1.

The illustrated symmetrical mountings could be replaced by unsymmetrical ones wherein one of the rabbets 9a, 9b or 19a, 19b is omitted, with corresponding reduction in the width of confronting groove 10 or 20, without significantly altering the performance of the bearing shown in FIG. 1 or FIG. 2.

We claim:

1. A journal bearing for rotatably supporting a shaft in a housing with absorption of both radial and axial stresses therebetween, said housing having a unitary wall with an inner peripheral surface coaxially surrounding said shaft, comprising:
    a geometrically continuous inner bearing ring on the peripheral surface of said shaft;
    a geometrically continuous outer bearing ring tightly fitted into the peripheral surface of said wall;
    two axially spaced sets of rotary bodies seated between said bearing rings, said bodies engaging said inner and outer bearing rings along respective contact zones axially offset from each other whereby said sets have seat axes converging toward one of said peripheral surfaces, said one of said peripheral surfaces being provided between said sets with an annular rib received in an annular peripheral recess on an adjoining surface of one of said bearing rings for resisting axial displacement of said one of said bearing rings with reference to said one of said peripheral surfaces, said one of said bearing rings being split into a pair of axially abutting halves, said recess being constituted by an annular rabbet on at least one of said halves terminating at a radial face which confronts an adjoining radial face of the other of said halves; and
    a pair of abutments on the other of said peripheral surfaces holding the other of said bearing rings in axially fixed position therebetween.

2. A journal bearing as defined in claim 1 wherein said other of said bearing rings is split into two halves axially abutting each other along a radial plane which includes the adjoining faces of said one of said bearing rings.

3. A journal bearing as defined in claim 2 wherein said one of said peripheral surfaces has an annular groove axially coextensive with said annular recess, said rib being a retaining ring seated in an annular channel defined by said groove and said recess.

4. A journal bearing as defined in claim 3 wherein said channel and said retaining ring have substantially rectangular cross-sections.

5. A journal bearing as defined in claim 4 wherein said retaining ring is axially narrower than said channel.

6. A journal bearing as defined in claim 3 wherein said retaining ring consists of a material substantially more yieldable than that of said inner and outer rings.

7. A journal bearing as defined in claim 6 wherein said retaining ring consists of synthetic resin.

8. A journal bearing as defined in claim 7, further comprising conduit means terminating at said channel for the introduction of synthetic resin to form said retaining ring.

9. A journal bearing as defined in claim 1 wherein said inner bearing ring forms seats positively holding said rotary bodies against relative axial displacement.

10. A journal bearing as defined in claim 1 wherein both said halves are formed with annular rabbets symmetrical with reference to a plane including said radial faces.

11. A journal bearing for rotatably supporting a shaft in a housing with absorption of both radial and axial stresses therebetween, said housing having a unitary wall with an inner peripheral surface coaxially surrounding said shaft, comprising:
- a geometrically continuous inner bearing ring on the peripheral surface of said shaft;
- a geometrically continuous outer bearing ring tightly fitted into the peripheral surface of said wall, each of said bearing rings being split into two axially abutting halves along a plane of symmetry common to both rings;
- two axially spaced sets of rotary bodies seated between said bearing rings, said bodies engaging said inner and outer bearing rings along respective contact zones axially offset from each other whereby said sets have seat axes converging toward one of said peripheral surfaces, said one of said peripheral surfaces being provided between said sets with an annular groove axially coextensive with an annular peripheral recess on an adjoining surface of one of said bearing rings and defining therewith an annular channel of substantially rectangular cross-section;
- a retaining ring of substantially rectangular cross-section, axially narrower than said channel, seated in said channel for resisting axial displacement of said one of said bearing rings with reference to said one of said peripheral surfaces; and
- a pair of abutments on the other of said peripheral surfaces holding the other of said bearing rings in axially fixed position therebetween.

* * * * *